United States Patent [19]

Mumford

[11] Patent Number: 4,514,209
[45] Date of Patent: Apr. 30, 1985

[54] GLASS FEEDER TUBE SUPPORT
[75] Inventor: Eustace H. Mumford, Ottawa Lake, Mich.
[73] Assignee: Owens-Illinois, Inc., Toledo, Ohio
[21] Appl. No.: 556,810
[22] Filed: Dec. 1, 1983
[51] Int. Cl.$^3$ .............................................. G03B 7/08
[52] U.S. Cl. ...................................... 65/328; 65/325; 65/330
[58] Field of Search .................. 65/325, 328, 330, 331
[56] References Cited

U.S. PATENT DOCUMENTS

| | | | |
|---|---|---|---|
| 2,470,558 | 5/1949 | Honiss | 65/330 X |
| 3,239,326 | 3/1966 | Tyner | 65/330 |
| 3,419,373 | 12/1968 | Gould et al. | 65/330 X |
| 4,328,023 | 5/1982 | Vilk | 65/328 |

Primary Examiner—Arthur Kellogg
Attorney, Agent, or Firm—Gerald T. Welch; Steve M. McLary; John R. Nelson

[57] ABSTRACT

The feeder tube in a molten glass gob feeder is mounted in a holder which is supported in the feeder structure by a pair of opposed hollow shafts. The shafts are vertically adjustable by the fact that they have their lower ends threaded onto vertical screws. The vertical screws are mounted for rotation about their vertical axes, in unison, to effectively raise or lower the shafts as desired. A scale and pointer arrangement indicates the tube height relative to the feeder bottom. The feeder tube is mounted in the holder such that reciprocation of a plunger in the tube will not raise the tube relative to the feeder.

6 Claims, 4 Drawing Figures

GLASS FEEDER TUBE SUPPORT

This invention relates generally to an apparatus for supporting and driving a mixing tube in a feeder bowl of a glass gob feeding mechanism for glass forming machines. More particularly, this invention relates to an improved rotating tube carrier which is provided with improved means for adjusting the height of the tube relative to the feeder bowl.

It has been the practice in the past, such as shown in U.S. Pat. No. 1,750,972 to Soubier, to provide a feeder bowl having a lower orifice with the feeder bowl communicating with a forehearth supplied with molten glass. In the above-referred-to Soubier patent, the glass is controlled in its flow from the feeder bowl by the rotation of a feeder tube. The feeder tube has its vertical axis in alignment with the orifice therebeneath. The feeder tube's function is to provide some mixing or temperature equalization of the glass entering the feeder bowl by moving the glass in a generally circular manner. Furthermore, the lower end of the tube is spaced from a bottom, annular, dam formed in the feeder bowl and this spacing of the tube from the dam in the bottom of the feeder bowl will regulate the rate at which glass will be supplied to the interior of the tube above the orifice. Rotation of the tube about its vertical axis is provided through the fact that the tube holder has a bevel gear that is driven with a pinion gear, for example, as shown in U.S. Pat. No. 3,334,987 to Davey et al. In this patent an overhead frame which supports the feeder tube is shown as being supported by a vertical shaft or post 11. While not specifically shown in this patent, the post 11 normally is mounted to the feeder bowl which is a fixed member usually having its outer structure formed of cast iron or steel. In this Davey et al patent, the frame 10 is being supported at the upper end of a vertical post 11. The frame 10 carries the tube 12 shown therein in a cantilever manner extending out over the feeder bowl and the weight of the tube would be somewhat counterbalanced by the structure shown to the left in FIG. 1 where the frame is shown supporting a motor and gear box. The output shaft is coupled at 47 to drive a pinion 32.

Of necessity, the tubes have become larger and heavier, particularly since the feeders are now feeding a plurality of mold charges simultaneously from a plurality of orifices positioned in the bottom of the feeder bowl. The post 11 thus is required to support a greater and greater amount of weight. Furthermore, since the feeder tube also is positioned in surrounding relationship to a vertically reciprocated plunger, the plunger has a tendency of raising or lowering the tube due to the viscosity of the glass positioned within the confines of the tube. As previously stated, with the increased diameter tubes and the anticipated outflow of larger quantities of glass from beneath the tube necessitating an increased diameter in the tube, it has become more difficult to regulate the feeder.

With the foregoing in view, it is an object of the present invention to provide a glass feeder tube mounting system in which the tube is vertically adjustable and still held by a mechanism which will restrain the tube from any lateral or twisting motion with respect to the supports, as well as any vertical shifting due to plunger reciprocation.

It is a further object of this invention to provide a stable mounting for a rotating, molten glass feeder tube in which the tube is held centrally and is shiftable on its vertical axis with relative precision.

It is a still further object of this invention to provide a rotating glass gob feeder tube carrier which provides vertical adjustment of the feeder tube while maintaining the axis of the feeder tube on line with precision.

SUMMARY OF THE INVENTION

Apparatus for supporting a glass feeder tube comprising a main horizontal frame having a circular opening with means mounted in this opening for supporting a vertically oriented tube for rotation about its vertical axis, a drive motor mounted on the frame with means extending from the motor to the tube for rotating the tube and a pair of adjustable, vertical supports for the frame at opposite sides of the circular opening with means for adjusting the vertical supports in unison to raise or lower the tube.

DETAILED DESCRIPTION OF THE DRAWINGS

Figure 1:
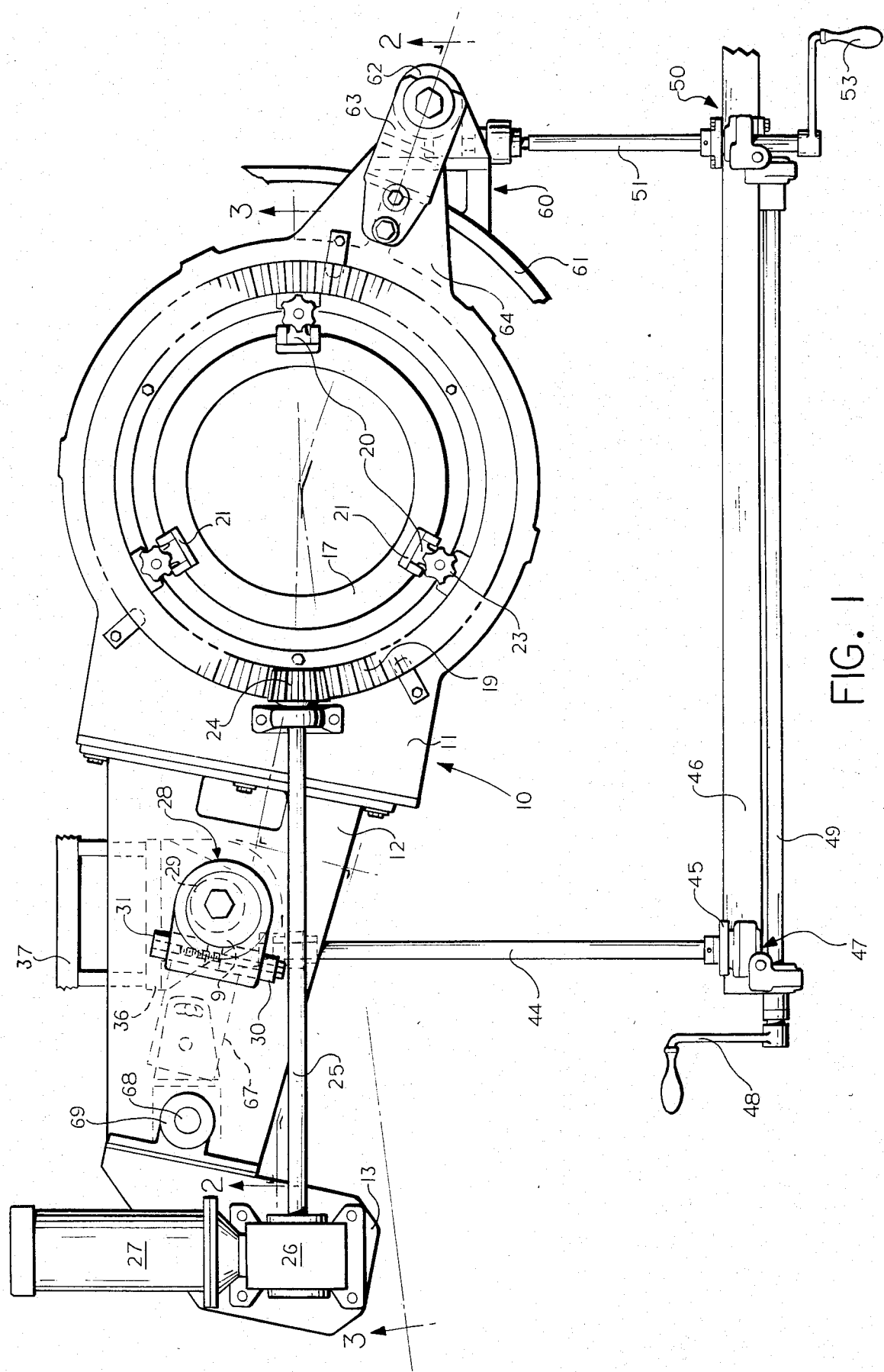
FIG. 1 is a top plan view of the tube carrier of the invention.

With particular reference to the drawings, the following detailed description of the invention is provided.

A main, generally horizontal support frame 10 is composed of three sections; a housing 11, a support bracket 12 bolted thereto and a motor mounting bracket 13 bolted to the bracket 12. The housing 11 has a circular opening therein which is centrally positioned or located thereof. Adjacent the inner edge of this opening is provided a lower race 14 of a ball bearing assembly 15. The upper race of the ball bearing assembly 15 supports an annular tube holder 16. The tube holder 16 generally takes the form of an annular ring having an inwardly extending, lower, tube supporting ledge and an outwardly extending, bevel gear supporting surface. The holder 16 supports a tube 17 and, as shown best in FIG. 2, the tube 17 has an outstanding lip 18 which actually rides on the holder 16. The holder 16 has an upper surface to which is mounted a bevel gear 19.

Figure 3:
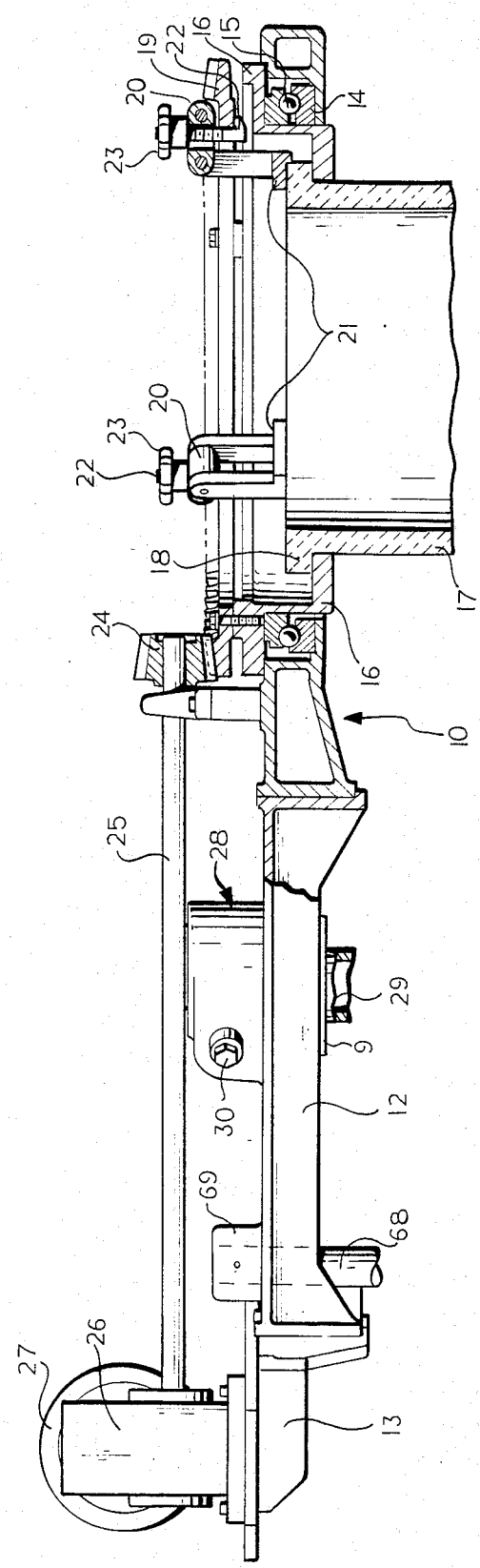
FIG. 3 is a cross-sectional view taken along the line 3—3 of FIG. 1, on a slightly enlarged scale.

During the operation of the feeder, where a plunger (not shown) reciprocates with the tube 17, there is the tendency for the tube to be lifted when the plunger is lifted due to the presence of viscous glass therebetween. To avoid such occurrence, the bevel gear 19, at three equi-spaced points thereabout, is provided with a pivoted clamp link 20. Each clamp link 20, at its inwardly extending end, is pivotally connected to a hold down clamp 21. As can best be seen in FIG. 3, the hold down clamp 21 has a lower surface which engages the lip 18 of the tube 17. The clamp 21 is maintained in contact with the tube lip 18 by a hook bolt 22 which extends through an opening in the clamp link 20 and and has its lower end hooked under the bevel gear 19. The upper end of the hook bolt 22 is threaded in a knob 23. The knob 23 is a hand knob which may be tightened down on the hook bolt so that it biases the clamp link 20 in a counterclockwise direction, as viewed in FIG. 3. This in turn will bias the hold down clamp 21 against the lip 18 of the tube 17 and clamp the tube relative to the tube holder 16. As previously indicated, the holder 16 is connected to the bevel gear 19. Thus, it can be seen that the tube 17 is mounted such that it may be rotated about its vertical axis by driving the bevel gear 19. To accomplish this, the bevel gear 19 is engaged by a pinion gear 24 at the end of a shaft 25. The shaft 25 extends from a gear box 26 mounted on the motor mounting bracket 13. The gear box 26 in turn is connected to a drive motor 27.

The support bracket 12, on its upper surface, carries an annular, shaft engaging casting 28. The casting 28 is formed as a part of the supporting bracket 12 and is provided with an opening therethrough within which an eccentric bushing 9 is seated. A hollow shaft 29 is pinned to a bushing 9 and the bushing 9 is clamped by a binder 30 and a binder nut 31 to the casting 28. A hex head cap screw 32 extends through the binder 30 and threads into the binder nut 31. Thus, upon takeup of the hex head cap screw 32, the binder nut and binder will be drawn toward each other and their surfaces then will engage a portion of the outer circumference of the bushing 9 and thereby clamp the bushing within which the upper end of the shaft 29 is seated.

At the lower end of the hollow shaft 29, there is positioned an adjusting nut 33. The shaft 29 extends telescopically into a tubular portion 34 of a bracket 35. The bracket 35 is formed at its lower end with a vertical plate portion 36 which is bolted to the side of a stationary member 37 shown broken away. The lower end of the tubular portion 34 of the bracket 35 is closed with a cap 38. The cap 38 rotatably supports the lower end of a vertical adjusting screw 39 which threads through the adjusting nut 33. The adjusting screw 39, at its lower end which extends through the cap 38, carries a gear 40. The gear 40 is keyed to the lower end of the adjusting screw 39 by a key 41 and is retained by a nut 42 threaded to the lower end of the shaft. The gear 40 is in engagement with a worm 43 which is keyed to a horizontal shaft 44. The forward end of the shaft 44 is supported in a vertical support bracket 45 which in turn is mounted to a horizontal bar 46. The end of the shaft 44 which extends through the bracket 45 carries a universal gear joint 47. The gear joint 47 supports one end of a shaft 49 and is coupled thereto. A hand crank 48 is connected to the left end as viewed in FIGS. 1 and 4 of the shaft 49 which extends through the other portion of the gear joint 47. A pair of beveled gears forming a part of the gear joint are connected to the shafts 44 and 49. Operation of the hand crank 48 will rotate both the shaft 49 and the shaft 44 and effect the adjustment of the hollow shaft 29 relative to the bracket 35.

Figure 4:
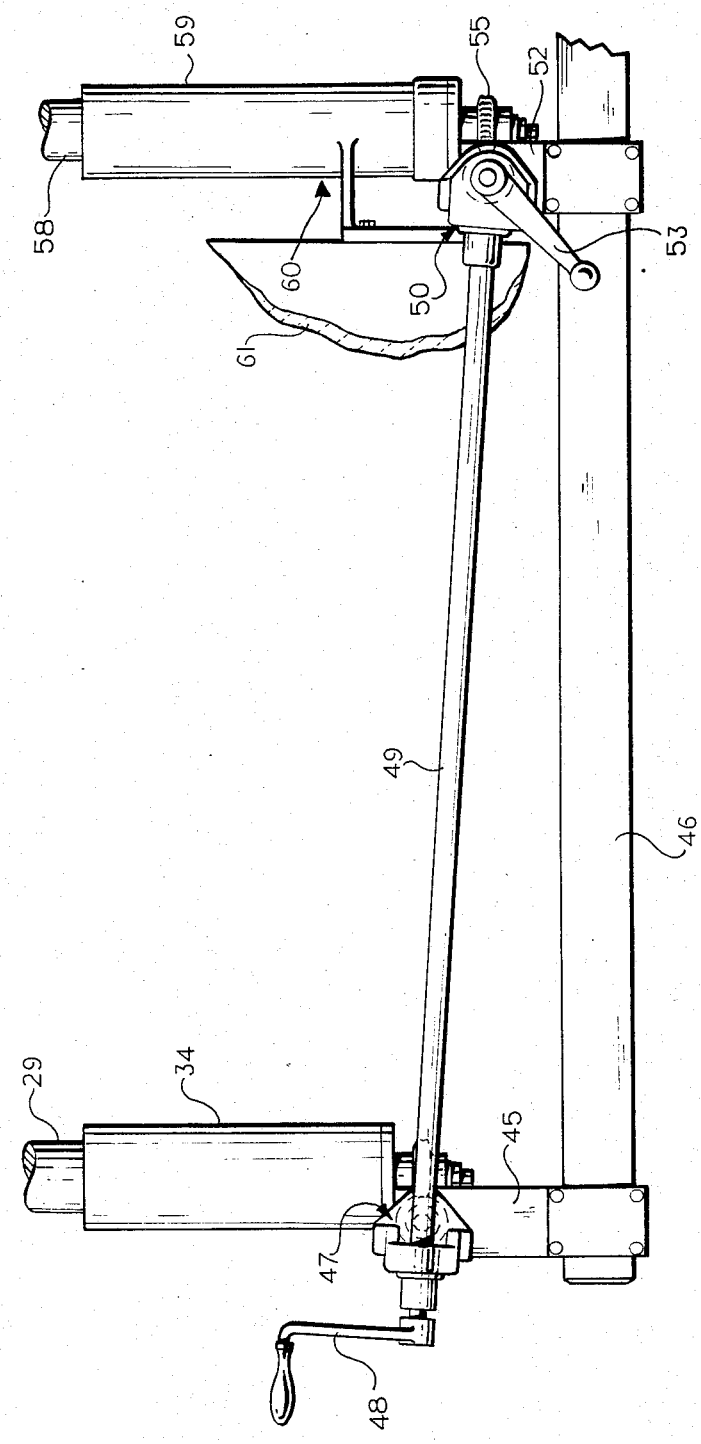
FIG. 4 is a side elevational view of the lower mechanism of FIG. 1 illustrating the vertical adjustability, on a somewhat enlarged scale.

As best seen in FIG. 4, the shaft 49 extends at a somewhat downwardly inclined angle and at its lower end carries a gear joint 50. The gear joint 50 is coupled to a generally horizontal shaft 51 which is also supported adjacent the universal gear joint 50 by a bracket 52 carried by or supported by the horizontal, fixed bar 46. The shaft 51, as seen in FIG. 1, extends through the gear joint 50, and at its outer end carries a hand crank 53. The shaft 51 is coupled to a worm 54 of an adjustment mechanism similar to that shown to the left in FIG. 2. The worm 54 drives a gear 55 which rotates an adjusting screw 56 which is threaded in an adjusting nut 57 mounted within the lower end of a hollow shaft 58. The hollow shaft 58 is guided by a tubular portion 59 of a bracket 60. The bracket 60 is mounted to the side of the feeder bowl portion 61. The upper end of the shaft 58 carries a shaft head 62. An adjusting plate 63 overlies the head 62 and is bolted to an outwardly extending boss 64 formed integral with the housing 11. The boss 64 overlies and rests upon an extending end portion 65 of the shaft head 62. Thus, it can be seen that the hollow shaft 58, which extends into the head 62, supports the right side of the housing 11, while the hollow shaft 29 supports the supporting bracket 12 at the opposite side of the tube 17. Thus, the two hollow shafts 29 and 58 serve to support the horizontal frame 10. Furthermore, the operation of either crank 48 or 53 through the operation of the universal joint gears will rotate the adjusting shafts and elevate the tubular shafts 29 and 58 in unison as desired.

In order to determine the existing height of the tube relative to its lower end position within the molten glass in the feeder, there is provided a vertical scale 66 supported from an arm portion 67 of the stationary bracket 35. A vertical shaft 68, mounted within a boss 69 carried by the upper surface of the supporting bracket 12, serves to support and mount a pointer 70. The pointer 70 in cooperation with the scale 66 will provide a visual indication of the relative height of the tube 17 and the feeder bowl. Since the bracket 35 is mounted to the feeder bowl and carries the scale while the supporting bracket 12 is adjustable relative to the bowl, the pointer 70 will move relative to the scale 66 upon adjustment of the horizontal frame 10.

Figure 2:
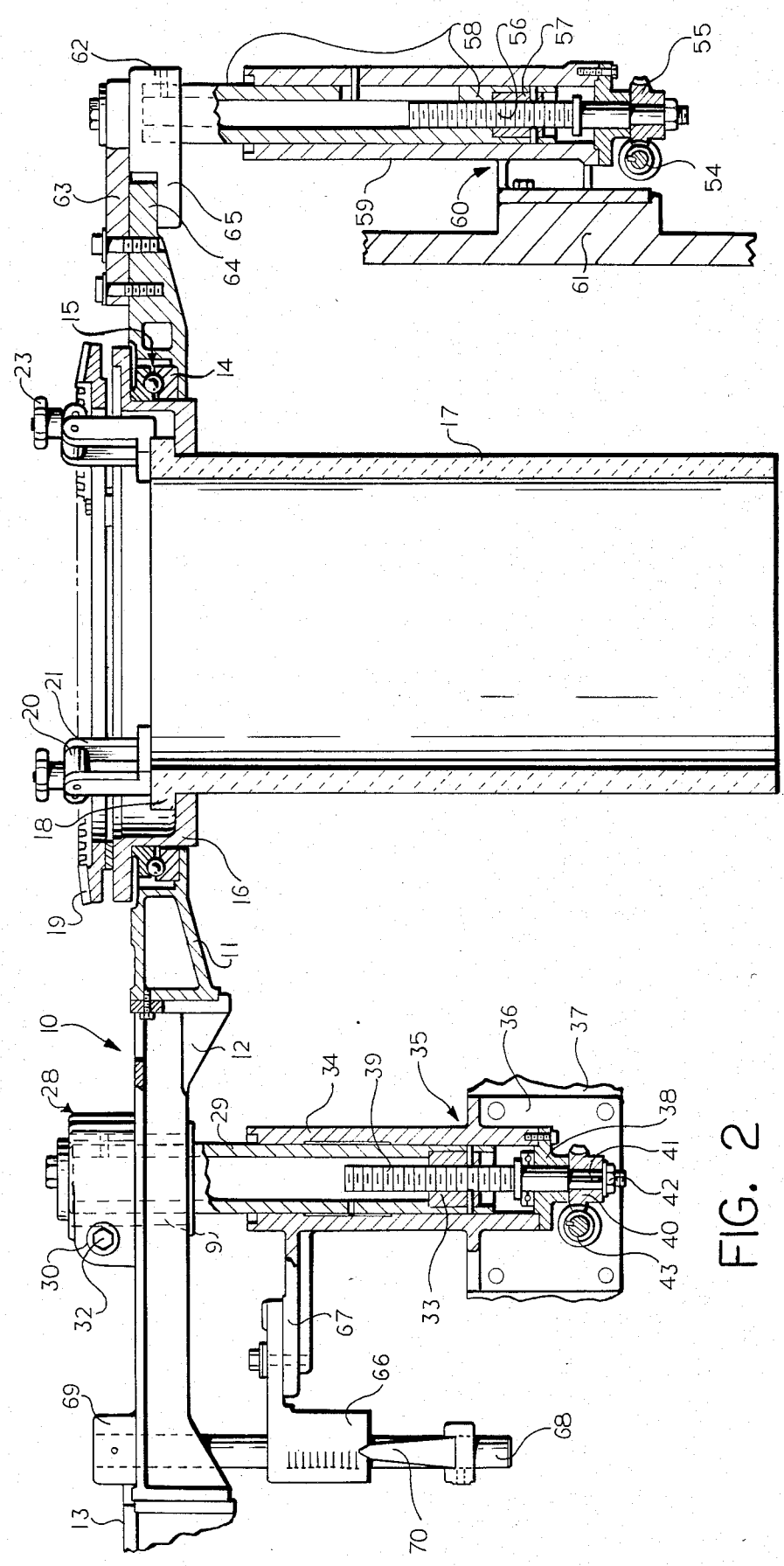
FIG. 2 is a cross-sectional view taken generally along the line 2—2 of FIG. 1, on a slightly enlarged scale.

In the position illustrated in FIG. 2 where the pointer 70 is at the lower end of the scale, the lower end of the tube will be at its lowest position. The tube will be practically closing the lower feeder opening and no glass will be able to enter the interior of the tube or be discharged from the feeder.

The operation of either crank will effect an adjustment of the tube height in the feeder bowl. The purpose of having two hand cranks is to give the operator two locations from which the adjustment may be accomplished.

It should be understood that the environment of the feeder is extremely hot and access to the sides of the bowl are not the most convenient positions. Other feeder adjustments such as plunger height, shear blade tension and drop guide adjustment are provided at various positions around the bowl. Thus, the dual adjustment positions of the present invention make the height of tube adjustment convenient from positions adjacent the other adjustments.

In the past, where the tube was mounted to a single, vertically adjustable post, it would be necessary to support all of the tube drive mechanism from the single post. The present invention provides dual support posts that are so arranged that they will always be operated in unison and the tube drive mechanism is assured of being adequately supported even as it becomes larger due to the greater throughput of glass from the feeders. The ability to adjust the tube height with assurance that the adjustment will be made without misaligning the tube is significant.

While the foregoing description of the invention is directed to the best mode contemplated by Applicant, it should be apparent that modifications may be resorted to without departing from the spirit and scope of the appended claims.

I claim:

1. Apparatus for supporting a glass feeder tube in a feeder bowl, comprising a main horizontal frame having a circular opening therethrough, an annular bearing and ring mounted in said opening for supporting said feeder tube for rotation about its vertical axis, a drive motor mounted at one end of said frame, a drive shaft extending from said motor to said tube to said ring for rotating said tube, a first adjustable, vertical, support mounted to said feeder bowl and extending up to said frame, said support connected to said frame at one side of said tube, a second adjustable vertical support mounted to said feeder bowl and extending up to and connected to said frame at a point on the opposite side of said tube, and means for adjusting the length of said supports in equal increments.

2. The feeder of claim 1 wherein each of said vertical supports comprises a tube, an internally threaded member fixed in said tube, a rotatable, threaded shaft extending into said threaded member, and stationary means surrounding said tube for guiding said tube for vertical movement; and common drive means connected between said threaded shafts for rotating said shafts to effect vertical adjustment of said tube.

3. The support of claim 1 wherein said vertical supports are adjustable in length to raise or lower the tube.

4. The support of claim 3 including means extending between said members for adjusting said members in sychronism.

5. The apparatus of claim 1 wherein said vertical supports comprise vertical threaded tube and shaft means.

6. The apparatus of claim 5 wherein said shafts are rotatably mounted, and further including drive means connected to said shafts for turning said shafts in unison.

* * * * *